US011885289B2

(12) United States Patent
Crow et al.

(10) Patent No.: US 11,885,289 B2
(45) Date of Patent: Jan. 30, 2024

(54) COMPONENTS FORMED WITH HIGH STRENGTH STEEL

(71) Applicant: Caterpillar Inc., Peoria, IL (US)

(72) Inventors: Jonathan Robert Crow, Germantown Hills, IL (US); Lucy Victoria Berg, Germantown Hills, IL (US); Douglas Edward Guyer, II, Bloomington, IL (US); Michael Alan Pershing, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/246,146

(22) Filed: Apr. 30, 2021

(65) Prior Publication Data

US 2022/0349370 A1 Nov. 3, 2022

(51) Int. Cl.
*F02M 61/16* (2006.01)
*C21D 1/06* (2006.01)
(Continued)

(52) U.S. Cl.
CPC ............ *F02M 61/166* (2013.01); *C21D 1/06* (2013.01); *C21D 9/0068* (2013.01);
(Continued)

(58) Field of Classification Search
None
See application file for complete search history.

(56) References Cited

U.S. PATENT DOCUMENTS 5,879,480 A * 3/1999 Hetzner ............... B23K 35/004 148/525
2011/0315793 A1* 12/2011 Michlik .................... B24B 1/00 451/51
(Continued)

FOREIGN PATENT DOCUMENTS

CN 109735794 A 5/2019
CN 109735794 B 1/2020
(Continued)

OTHER PUBLICATIONS

Written Opinion and International Search Report for Int'l. Patent Appln. No. PCT/US2022/022240, dated Jun. 15, 2022 (14 pgs).

*Primary Examiner* — Humera N. Sheikh
*Assistant Examiner* — Kim S. Horger
(74) *Attorney, Agent, or Firm* — Lee & Hayes, P.C.

(57) ABSTRACT

An example component of a machine includes a core layer and an outer layer encasing the core layer. The outer layer has a greater carbon concentration and hardness than the core layer. The outer layer may also be compressively stressed, while the core layer may have tensile stress. The stress and/or hardness profile of the component may enhance its resistance to cracking, particularly in applications where the component is impacted by other object and/or operates at elevated temperatures. The component, such as parts of a fuel injector, may be formed by rough forming the component, carburizing the component, quenching the component, subzero processing the component, and then performing a tempering process. The components may have relatively
(Continued)

sharp transition from the high carbon outer layer to the lower carbon core layer. Additionally, the components have a relatively high tempering resistance when used in relatively high temperature environments.

10 Claims, 5 Drawing Sheets

(51) Int. Cl.

| | |
|---|---|
| ***C21D 9/00*** | (2006.01) |
| ***C22C 38/00*** | (2006.01) |
| ***C22C 38/02*** | (2006.01) |
| ***C22C 38/04*** | (2006.01) |
| ***C22C 38/44*** | (2006.01) |
| ***C22C 38/46*** | (2006.01) |
| ***F02M 61/18*** | (2006.01) |

(52) U.S. Cl.
CPC ............ *C22C 38/002* (2013.01); *C22C 38/02* (2013.01); *C22C 38/04* (2013.01); *C22C 38/44* (2013.01); *C22C 38/46* (2013.01); *F02M 61/18* (2013.01)

(56) References Cited

U.S. PATENT DOCUMENTS

| | | | |
|---|---|---|---|
| 2015/0159259 | A1 | 6/2015 | Moyer |
| 2018/0119266 | A1 | 5/2018 | Buckley |

FOREIGN PATENT DOCUMENTS

| | | | | | |
|---|---|---|---|---|---|
| EP | 2405028 | B1 | 3/2016 | | |
| KR | 20090008554 | A | 1/2009 | | |
| WO | WO2001/068933 | A2 | 9/2001 | | |
| WO | WO-2010116670 | A1 | * | 10/2010 | ............... C21D 1/06 |
| WO | 2016126456 | W | 8/2016 | | |

* cited by examiner

300

| ELEMENT CONCENTRATION | CARBON (C) BY WEIGHT | MANGANESE (Mn) BY WEIGHT | SILICON (Si) BY WEIGHT | PHOSPHOROUS (P) BY WEIGHT | SULFUR (S) BY WEIGHT | NICKEL (Ni) BY WEIGHT | CHROMIUM (Cr) BY WEIGHT | MOLYBDENUM (Mo) BY WEIGHT | VANADIUM (V) BY WEIGHT |
|---|---|---|---|---|---|---|---|---|---|
| RANGE | 0.17% - 0.5% | 0.2% - 1% | 0% - 0.3% | 0% - 0.03% | 0% - 0.01% | 0% - 0.3% | 1.5% - 2% | 1.7% - 2.4% | 0.1% - 1% |

302

| ELEMENT CONCENTRATION | CARBON (C) BY WEIGHT | MANGANESE (Mn) BY WEIGHT | SILICON (Si) BY WEIGHT | PHOSPHOROUS (P) BY WEIGHT | SULFUR (S) BY WEIGHT | NICKEL (Ni) BY WEIGHT | CHROMIUM (Cr) BY WEIGHT | MOLYBDENUM (Mo) BY WEIGHT | VANADIUM (V) BY WEIGHT |
|---|---|---|---|---|---|---|---|---|---|
| VALUE | 0.3% | 0.5% | 0.13% | 0.013% | 0.001% | 0.2% | 1.7% | 2% | 0.5% |

FIG. 3

COMPONENTS FORMED WITH HIGH STRENGTH STEEL

TECHNICAL FIELD

The present disclosure relates to formation of steel components. More specifically, the present disclosure relates to fuel injector nozzle tips and other components formed with high strength steel to achieve improved crack resistance and improved usable lifetimes.

BACKGROUND

Machines are in widespread use in construction, mining, paving, forestry, and other similar industries. These machines are powered by any suitable fuel, such as diesel, gasoline, bio-diesel, liquid natural gas (LNG), compressed natural gas (CNG), any variety of petroleum distillates, and/or other hydrocarbons. The flow of these fuels into internal combustion engines of the machines is often controlled using a fuel injector. The fuel injectors often have moving parts that operate at relatively high temperatures to control the delivery of fuel to combustion cylinders of the internal combustion engines. For example, a diesel fuel injector may include a moving nozzle valve that controls the flow of fuel via an orifice through a nozzle tip of the fuel injector. In such a configuration, the nozzle valve may provide fuel flow control by moving and selectively making contact with nozzle tip of the fuel injector to selectively open or block the orifice through the nozzle tip. Due to the hot operating environment during engine operation and repeated contact between parts of the fuel injector, cracks can develop in the nozzle tip, the nozzle valve, and/or other components of the fuel injector or in other components of the engine.

In addition to internal combustion engines of these machines, with parts that operate in harsh (e.g., impact-inducing, hot ambient, etc.) environments, the machine often include hydraulic systems, such as to move or carry materials (e.g., dirt, gravel, etc.). These hydraulic systems may include components, such as cylinders and pistons that can operate under high pressures, and sometimes excessive heat. Thus, these hydraulic components, operating under harsh conditions, may also develop cracks and/or other defects during operation that can reduce the lifetime of these components and involve costly in-the-field downtime and maintenance.

Further still, the undercarriage of such machines, in some cases, may utilize track assemblies, rather than wheels, to provide ground-engaging propulsion. Such track assemblies may be preferred in environments where creating sufficient traction is problematic, such as those frequently found in the industries identified above. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, drive sprockets, idlers, tensioners, and rollers, for example. Such track chain assemblies can operate in extremely adverse environments in which track joints may be exposed to various abrasive mixtures of water, dirt, sand, rock or other mineral or chemical elements. As a result, the components of the track chain assembly can wear out and cracks and/or other defects can form in the various the components of the track chain, such as the bushings, sprockets, idlers, etc. Additionally, the machines may have other components, such as work edges, that may be prone to cracking and/or other defects due to harsh operating environments.

An example of producing components with a relatively high level of surface hardness is described in Chinese Pat. No. 10,973,579 (hereinafter referred to as the '579 patent). As noted in the '579 patent, in a steel thermal treatment process for surface hardening, a steel component may be subject to a carburizing treatment, followed by a quench and deep cooling treatment. However, the process described in the '579 patent also requires multiple additional steps, and the disclosed process does not maximize the amount of surface carbon provided to the steel components. Additionally, in the steel hardening process described in the '579 reference, the metallurgical composition of the steel does not result in a desired surface hardness or a desired stress profile.

Example embodiments of the present disclosure are directed toward overcoming the deficiencies described above.

SUMMARY

In an example of the disclosure, a component includes an outer layer having a hardness of at least about 55 Rockwell Hardness Scale C (HRC) and compressive stress, the outer layer having a vanadium content of at least about 0.1% by weight. The component further includes a core layer encased by the outer layer, the core layer having a hardness less than about 55 HRC and tensile stress, wherein the outer layer is at least 250 micrometers (μm) in thickness and wherein the outer layer has a first hardness of at least 59 HRC at a depth of at least 250 μm after the component is exposed to a temperature of at least about 300° C. for at least about 3 hours.

In another example of the disclosure, a machine includes one or more components. The at least one of components include an outer layer including an outer surface having a first hardness of at least about 55 HRC and compressive stress. The at least one of components further includes a core layer encased by the outer layer, the core layer having a second hardness less than about 55 HRC and tensile stress, wherein, a third hardness at a first depth of about 250 microns (μm) from the outer surface is at least about 59 HRC and a fourth hardness at a second depth of about 600 μm is less than about 53 HRC after the component is exposed to a temperature of at least about 300° C. for at least about 3 hours.

In yet another example of the disclosure, a method of manufacturing a machine component includes forming a rough component with steel having a carbon content less than about 0.5% by weight and a vanadium content of at least about 0.1% by weight and carburizing the rough component, at a carburizing temperature of at least about 900° C., to form a carburized outer layer of the machine component. The method further includes quenching the carburized rough component directly from the carburizing temperature, performing a subzero treatment of the quenched rough component, and tempering the subzero treated rough component to form the machine component.

BRIEF DESCRIPTION OF DRAWINGS

FIG. 3 illustrates charts depicting example metallurgical compositions of components of the machine as depicted in FIG. 1, according to examples of the disclosure.

DETAILED DESCRIPTION

Figure 1:
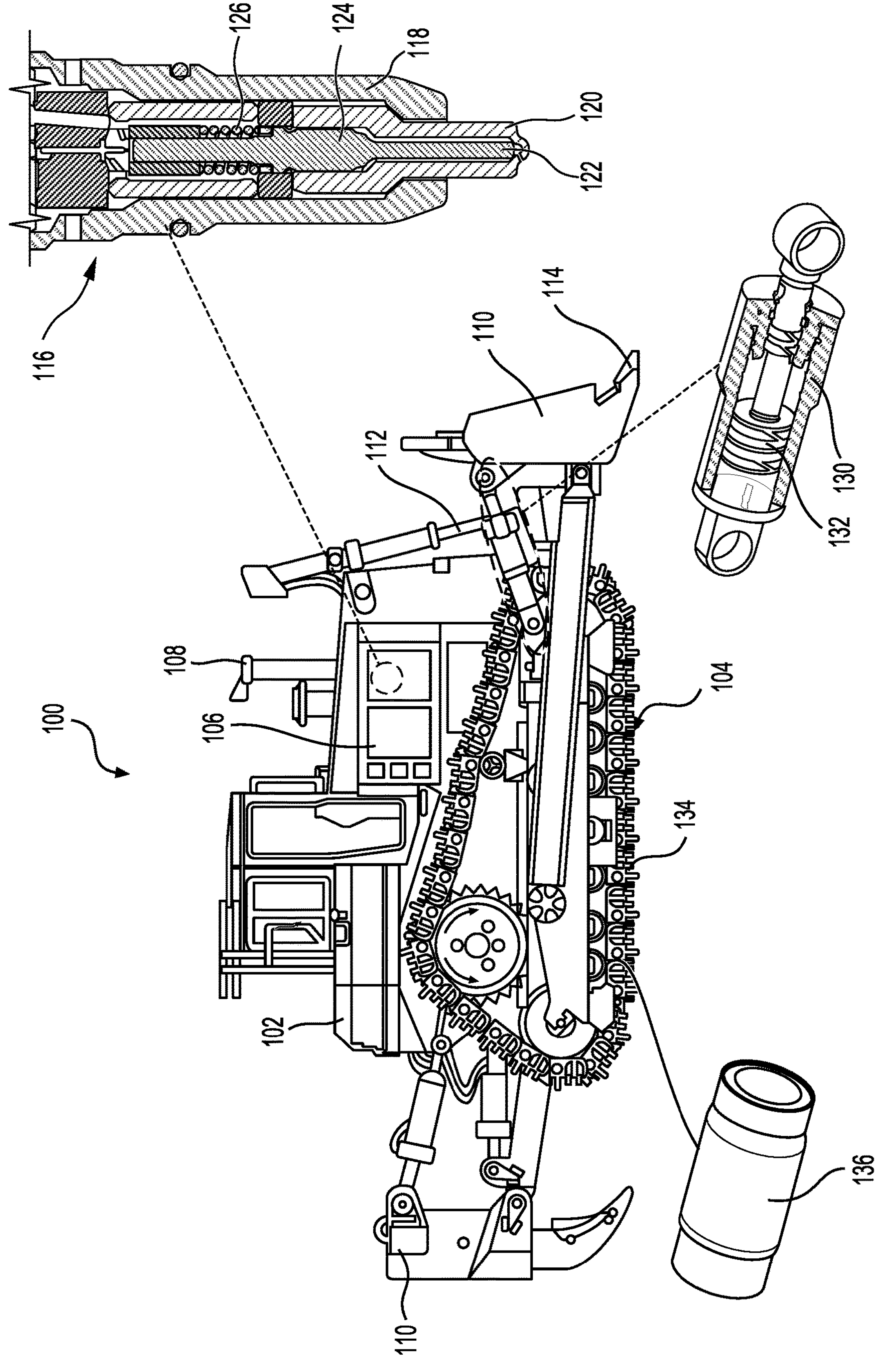
FIG. 1 is a schematic illustration of an example machine with one or more components formed in accordance with examples of the disclosure.

Wherever possible, the same reference numbers will be used throughout the drawings to refer to the same or like parts. FIG. 1 is a schematic illustration of an example machine 100 with one or more components formed in accordance with examples of the disclosure. Although the machine 100 is depicted as a dozer, it should be understood that the machine 100 may be of any suitable type, such as those used in construction, farming, mining, paving, transportation, or the like. In other examples, the machine 100 may be any suitable machine 100, such as, a loader, an excavator, a tank, a backhoe, a drilling machine, a trencher, a combine, or any other on-highway or off-highway vehicle.

The machine 100 includes a frame 102 on which other elements of the machine 100 are mounted. The machine 100 includes a propulsion system 104, such as a track chain assembly, as shown. Alternatively, the machine 100 may have any other suitable type of propulsion system 104, such as wheels and tires. The machine 100 further includes an engine 106, such as an internal combustion engine using hydrocarbon fuels. Alternatively, the machine 100 may be an electrically powered machine. The machine 100 includes an exhaust system 108 and/or one or more work systems 110 that are movable by one or more hydraulic systems 112. The machine 100 also includes a transmission system (not shown) that mechanically couples the engine 106 to the propulsion system 104. According to examples of the disclosure, any component of the machine 100, including any variety of components of the propulsion system 104, the engine 106, the exhaust system 108, the work systems 110, the hydraulic systems 112, the transmission, etc., may be formed by the processes disclosed herein. Additionally, any of the aforementioned components of the machine 100 may have the structure and the resultant material properties as disclosed herein, when formed by the processes disclosed herein.

The work systems 110 may include any variety of components, such as a cutting edge 114. The cutting edge 114 and/or other components of the work systems 110 may be subject to tribologically and/or thermally harsh operating environments, such as in moving gravel, picking up stones, redistributing asphalt, etc. In many cases, the cutting edge 114 is exposed to repeated impact with hard objects (e.g., rocks) and in some cases may also be subject to relatively high temperatures (e.g., when distributing hot asphalt and/or tar, from frictional heating, etc.). Aspects of the present application enable forming cutting edges 114 and other components of the work systems 110 that are hard and/or high strength. This allows the cutting edge 114 to have a longer lifetime in use.

The engine 106 may include a variety of components that can be subject to the metallurgical composition and/or processing as disclosed herein to improve the strength and/or lifetime of those components. The engine 106 may include one or more fuel injector(s) 116, such as diesel injectors, that have improved properties when formed according to the disclosure herein. The fuel injector 116 may include a housing 118, with a nozzle tip 120 seated within the housing 118, and a nozzle valve 122 movably disposed within the nozzle tip 120. The nozzle valve 122 is mechanically coupled and/or connected to a plunger 124 that is configured to move the nozzle valve 122 in a longitudinal direction (e.g., up-and-down, as depicted in FIG. 1). A solenoid 126 controls the movement of the plunger 124, and by extension, the nozzle valve 122. As will be described in more detail in conjunction with FIG. 2, the movement of the nozzle valve 122 relative to the nozzle tip 120 controls the flow of fuel to components (e.g., a cylinder) of the engine 106 when the engine 106 is operating. However, this movement of the nozzle valve 122 causes the nozzle valve 122 to repeatedly impact the nozzle tip 120. Furthermore, during the operation of the engine 106, the impact between the nozzle valve 122 and the nozzle tip 120 occurs at relatively elevated temperatures, such as 200° C. or more, and sometimes 300° C. or more. This operating condition (e.g., repeated impacts at elevated temperatures) make the nozzle tip 120 and/or the nozzle valve 122 prone to fractures and/or other defects. The processing mechanisms and material compositions, as disclosed herein, when applied to the nozzle tip 120, the nozzle valve 122, and/or other components of the fuel injector 116, results in stronger components, such as stronger nozzle tips 120 and/or nozzle valves 122 that are more durable and less prone to cracking. Additionally, in some cases, the processing mechanisms and material compositions, as disclosed herein, when applied to the nozzle tip 120, the nozzle valve 122, and/or other components of the fuel injector 116, results in advantageous stress profiles of these components, thereby enhancing the durability and/or lifetimes of those components. Although discussed in the context of the nozzle tip 120 and the nozzle valve 122, it should be understood that the metallurgical compositions and processes disclosed herein may be applied to a wide variety of components of the engine 106, such as combustion cylinders, piston heads, intake valves, exhaust valves, or the like.

The hydraulic system 112 may include a cylinder 130 and a piston 132 that is movably coupled to the cylinder 130. The piston 132 is mechanically coupled to the work system 110 to perform work tasks, such as lifting dirt or redistributing gravel. The cylinder 130 and/or piston 132, during operation may have relatively high level of stresses imparted on them, such as by pressurized hydraulic fluids. Additionally, the piston 132 may impact the cylinder 130 during operation of the hydraulic system 112. Thus, the cylinder 130 and piston 132 are prone to fracture and/or other types of failure, due to the conditions under which they operate. The processing mechanisms and material compositions, as disclosed herein, when applied to the cylinder 130 and/or the piston 132, results in stronger components, such as stronger cylinders 130 and/or the pistons 132 that are more durable and less prone to cracking.

The propulsion system may include one or more components, such as track shoes 134 and bushings 136, that may be exposed to harsh environments with high levels of stresses and frictional forces imparted thereon. For example, the track shoes 134 engage the ground, or other surface, and propel the machine 100 thereon. Thus, the track shoes 134 hold the weight of the entire machine 100, which can be on the order of 10's or even 100's of tons, as it travels over an abrasive surface. The track shoes 134 grinding against sand, dirt, rocks, etc. can result in cracking and/or other defects.

Similarly, the bushings 136 grind, with extremely high loading, against other metallic components of the propulsion system 104. This can lead to a variety of issues, such as cracking, galling, and/or other defects. The propulsion system 104, in the form of a track propulsion system, includes other components, such as rolling elements, sprockets, front idlers, rear idlers, track rollers, etc., that operate under harsh conditions where heavy loads and/or high levels of abrasion are imparted thereon. Due to the harsh operating environments and the loads put on various components of the propulsion system, it is desirable to improve material properties of the various components of the track chain assembly to improve the usable life of those components. According to examples of the disclosure, the various components of the propulsion system 104, such as the track shoes 134 and bushings 136, may be formed in manner that improves their wear resistance, while maintaining and/or improving their overall toughness.

While certain components (e.g., nozzle tips 120, nozzle valves 122, exhaust systems 108, cylinders 130, etc.) of the machine 100 are discussed herein as being formed by the steel compositions and/or processes disclosed herein, it should be understood that the disclosure herein to form high strength steel components may be applied to any suitable component associated with machine 100 or in other applications. For example, the processes as disclosed herein may apply to any variety of non-track type machine 100 components, to increase the surface hardness of those components, while maintaining a softer core region in those components to provide improved surface wear resistance and high toughness. As another example, the mechanisms as disclosed herein may apply to any variety of equipment components in other industries, such as aerospace, manufacturing, transportation, other mechanical systems, etc.

According to examples of the disclosure, components (e.g., fuel injector nozzle tip 120) may be roughly formed from steel and then subjected to a hardening process that provides a hard outer surface with a high carbon concentration and a softer core region. The resulting component is hard, tough, relatively fracture-resistant, and particularly well-suited for applications where there is metal-to-metal contact in relatively high temperature (e.g., greater than 150° C.) applications. The components formed by the mechanisms disclosed herein have a hard outer layer that, in some examples, is in the range of approximately 150 micrometers (μm) to approximately 3 millimeters (mm) thick. In other words, the hard outer layer encases the soft core layer of the components fabricated according to the mechanisms discussed herein. This hard outer layer, in some examples, may have a hardness in the range of approximately 55 Rockwell Hardness Scale C (HRC) to approximately 69 HRC, while the softer core region may have a hardness in the range of approximately 39 HRC to approximately 55 HRC. Additionally, in some cases, the hard outer layer may be under compressive stress, while the softer core portion may be under tensile stress.

It should be appreciated that the disclosure herein may result in a component having a carbon profile with a relatively sharp gradient or drop-off in the carbon content from the hard outer surface to the softer core region. This relatively sharp drop-off of the carbon profile may allow for relatively thin components or portions of components, such as the injector tip 120 to have a hard outer layer 206 while still maintaining the relatively soft core layer 204. This provides for a compressively stressed and hard outer surface for greater crack resistance, such as where maximum Hertzian stresses may be encountered, with a softer core for greater toughness. For example, in one hardness profile, a component may have a hardness of about 59 HRC or more at a depth of approximately 250 μm with a hardness of about 55 HRC or less at a depth of approximately 500 μm. In another example hardness profile, a component may have a hardness of about 59 HRC or more at a depth of approximately 250 μm with a hardness of about 54 HRC or less at a depth of approximately 600 μm after exposure to at least 300° C. for at least 3 hours. In yet another example hardness profile, a component may have a hardness of about 59 HRC or more at a depth of approximately 250 μm with a hardness of about 53 HRC or less at a depth of approximately 600 μm after exposure to at least 300° C. for at least 3 hours.

When there is impact between two parts (e.g., the nozzle valve 122 and the nozzle tip 120), the stresses due to the forces of that impact and material deformation therefrom may be maximum at some depth from the surface of those components. For example, in some cases, the maximum Hertzian stress from the impact of the nozzle valve 122 and the nozzle tip 120 may be approximately 200 μm depth into the surfaces of those components. By having the maximum Hertzian stresses from impact occur within the hard outer surface of the component, the component may be more resilient to cracking from the impact forces. This resiliency from cracking may be due to the relatively greater hardness of the hard outer layer of the component, the static compressive stress of the outer surface, or both of these factors. Additionally, the softer core region, even with relatively thin components, provides for a relatively high toughness of the component. Further still, the components, as disclosed herein, exhibit a relatively high resistance to tempering during use in relatively high temperatures. The components, as formed by the mechanisms disclosed herein, therefore, may be more durable and have a greater usable lifetime.

Figure 2:
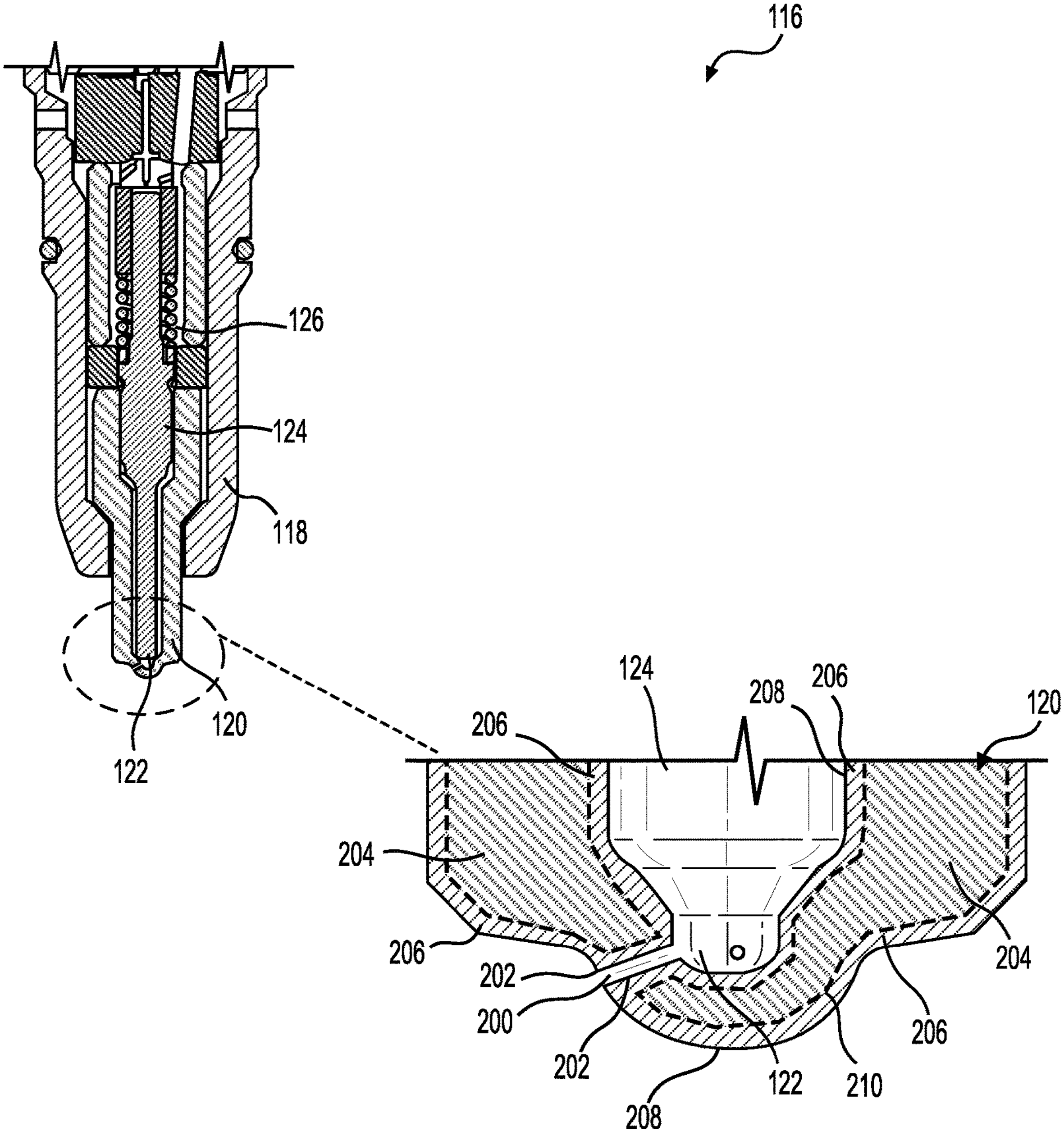
FIG. 2 is a schematic illustration of an example portion of a fuel injector of the machine as depicted in FIG. 1, according to examples of the disclosure.

FIG. 2 is a schematic illustration of an example portion of the fuel injector 116 of the machine 100 as depicted in FIG. 1, according to examples of the disclosure. For the ease of description, the various layers of the nozzle tip 120 is depicted and discussed. It should be understood that in some cases, the nozzle valve 122 may be formed in a manner similar to the nozzle tip 120 and have layers similar to the nozzle tip 120.

The nozzle tip 120 may include an orifice 200 therethrough defined by surface 202 of the nozzle tip 120. This orifice 200 is configured to allow the passage of fuel, such as diesel therethrough. When the nozzle valve 122 is moved to an upward position, or away from the nozzle tip 120, in its longitudinal direction, fuel may pass through the orifice 200. If, on the other hand, the nozzle valve 122 is in its downward position, or in contact with the nozzle tip 120, then the orifice 200 may be blocked and may not allow the passage of fuel therethrough. It is by the repeated movement of the nozzle valve 122 relative to the nozzle tip 120 that fuel is controllably supplied to the engine 106 of the machine 100.

The nozzle tip 120 includes a core layer 204, which may also be referred to as a core region or bulk region. The nozzle tip 120 also includes an outer layer 206, which may also be referred to as a hard layer, outer layer, or case layer. The outer layer 206 may extend from a surface 202, 208 of the nozzle tip 120 to an interface 210 between the core layer 204 and the outer layer 206. Although the interface 210 is depicted as an immediate transition from the outer layer 206 to the core layer 204, it should be understood that in some cases the interface 210 may be a region that transitions from the outer layer 206 to the core layer 204 of the nozzle tip 120. This transition, in some cases, may be gradual and/or graded. In other words, the interface 210 may represent a spatial transition region that embodies material properties intermediate between the core layer 204 and the outer layer 206. According to examples of the disclosure, the outer layer 206 of the nozzle tip 120 may be substantially martensitic and/or austenitic in crystal structure, and have a carbon content greater than that of the core layer 204.

In examples of the disclosure, the outer layer 206 may be harder than the core layer 204 of the nozzle tip 120. In some cases, the core layer 204 may have a hardness in the range of approximately 39 HRC to approximately 55 HRC. In other cases, the core layer 204 may have a hardness in the range of approximately 42 HRC to approximately 50 HRC. In yet other cases, the core layer 204 may have a hardness in the range of approximately 44 HRC to approximately 48 HRC. In some cases, the outer layer 206 may have a hardness in the range of approximately 55 HRC to approximately 69 HRC. In other cases, the outer layer 206 may have a hardness in the range of approximately 58 HRC to approximately 64 HRC. In yet other cases, the outer layer 206 may have a hardness in the range of approximately 60 HRC to approximately 62 HRC.

It should also be understood that the properties of the outer layer 206 may not be uniform throughout the thickness of the outer layer 206. In some cases, the presence of the outer layer 206 may be detected by measuring the hardness at a threshold depth into the outer layer 206. For example, the hardness at a depth of approximately 150 μm to approximately 300 μm from the surface 208 of the nozzle tip 120 may be in the range of approximately 56 HRC to about 67 HRC. In some cases, the hardness at a depth of approximately 200 μm to approximately 300 μm from the surface 208 of the nozzle tip 120 may be in the range of approximately 58 HRC to about 65 HRC. In yet some other cases, the hardness at a depth of approximately 225 μm to approximately 275 μm from the surface 208 of the nozzle tip 120 may be in the range of approximately 58 HRC to about 64 HRC. For example, in some cases, the hardness at a depth of 250 μm from the surface 208 of the nozzle tip 120 may be approximately a minimum of 59 HRC. At the same time, the hardness at the surface 208 may be approximately a minimum of 60 HRC.

The outer layer 206 may be of any suitable thickness. For example, the outer layer 206 may be a thickness in the range of about 150 μm to about 3 mm. In some other cases, the thickness of the outer layer 206 may be in the range of approximately 200 μm to about 1.5 mm. In yet other cases, the thickness of the outer layer 206 may be in the range of approximately 250 μm to about 1 mm. For example, the outer layer 206 may have a thickness of about 400 μm. Although the disclosure discusses certain thicknesses of the outer layer 206 herein, it should be understood that the disclosure contemplates thicknesses outside of the ranges discussed herein. It should also be understood that the thickness of the outer layer 206 may vary based on the component and/or the application of the component. For example, a thicker outer layer may be desired for a bushing 136, compared to the nozzle tip 120.

The outer layer 206 may have a thickness, in some cases, such that the maximum Hertzian stress generated due to impact between the nozzle tip 120 and the nozzle valve 122 is within the outer layer 206. The outer layer 206 is not just harder, but in some cases, the outer layer 206 is also in compressive stress, while the core layer 204 is in tensile stress. Thus, by engineering this component such that the maximum Hertzian stress from impacts is within a compressively stressed region, such as the outer layer 206, can result to less possibility of cracking and, therefore, greater durability of the component. In other words, the compressive nature of the outer layer 206 may inhibit crack formation and/or crack propagation. In addition to the advantageous stress profile described herein, the enhanced hardness of the outer layer 206 improves its wear resistance and durability to impacts, such as impacts at elevated ambient temperatures. In some examples, the outer layer 206 of the nozzle tip 120 may be approximately 400 μm thick and the maximum Hertzian stress from impacts between the nozzle valve 122 and the nozzle tip 120 may be at a surface depth of about 200 μm. Thus, in this example, the maxim Hertzian stress may occur in the relatively hard and compressively stressed outer layer 206 of the nozzle tip 120. As disclosed herein, the nozzle valve 122 may also be fabricated in a manner similar to what is depicted for the nozzle tip 120, in that the nozzle valve 122, in some cases, may also have a hard outer layer and a softer core layer. This makes the nozzle tip 120 and/or the nozzle valve 122 more resilient to the repeated impacts at elevated temperatures during the operation of the machine 100.

It should further be understood that the nozzle tip 120 may be relatively thin, and therefore, conventional hardening metallurgy and methods may fail at forming the hard outer layer 206 with the softer core layer 204. For the nozzle tip 120, a relatively sharp gradient in the carbon content from the surface 202, 208 to the core layer 204 may be desired to provide both the soft core layer 204 and the harder outer layer 206. The carbon profile for the nozzle tip 120 or other component, as disclosed herein, may have a relatively sharp gradient or drop-off in the carbon content from the outer layer 206 to the core layer 204. This relatively sharp drop-off of the carbon profile, therefore, allows for relatively thin components or portions of components, such as the injector tip 120, to have the hard outer layer 206 while still maintaining the relatively soft core layer 204. This provides for a compressively stressed and hard outer surface for greater crack resistance, such as where maximum Hertzian stresses may be encountered, with a softer core for greater toughness. For example, in one hardness profile, a component may have a hardness of about 59 HRC or more at a depth of approximately 250 μm with a hardness of about 55 HRC or less at a depth of approximately 500 μm. Additionally, the nozzle tip 120, the nozzle valve 122, or other component may be relatively temper resistant during use at relatively high temperatures. In other words, the outer layer 206 may be relatively resistant to softening during high temperature use. In one example, the component may maintain a hardness of 59 HRC at a depth of 250 μm even after about 3 hours or more of use at a temperature of about 300° C. The sharp hardness profile allows the component to have a hardness of less than 53 HRC at 600 μm depth from the surface 202, 208 after exposure to an ambient of at least 300° C. for at least 3 hours. This makes the nozzle tip 120 and/or the nozzle valve 122 more resilient to cracking and more durable at elevated temperatures during the operation of the machine 100.

FIG. 3 are charts 300, 302 depicting example metallurgical compositions of components of the machine 100 as depicted in FIG. 1, according to examples of the disclosure. As described herein, the components of machine 100, such as the nozzle tip 120, may be rough formed from steel having compositions as described herein, followed by further thermal processing to achieve the desired layered structure described in conjunction with FIG. 2. Rough forming, as used herein, refers to forming the shape of a component, prior to subsequent strengthening via thermal processing, such as annealing, quenching, carburizing, etc.

A rough formed component, such as the nozzle tip 120, may be formed from low to medium carbon (C) steel, with C content in the range of about 0.17% to about 0.5% by weight. The steel used to rough form the component may be any suitable crystal structure, such as ferrite, pearlite, cementite, bainite, martensite, and/or austenite. The initial low or medium carbon steel may be relatively soft and ductile, allowing for easier rough formation of the component, such as the nozzle tip and/or the nozzle valve 122. For example, the steel may have an initial hardness in the range of about 38 HRC to about 50 HRC. In other cases, higher C content steel may also be used. The steel may include a variety of other impurities and/or additives therein. For example, components of the machine 100 may be formed from steel that may further include other elements therein, such as manganese (Mn), phosphorus (P), sulfur (S), silicon (Si), chromium, (Cr), boron (B), cobalt (Co), molybdenum (Mo), nickel (Ni), titanium (Ti), tungsten (W), niobium (Nb), vanadium (V), combinations thereof, or the like. It should also be noted that prior to any carburizing, hardening, sub-zero, and/or tempering treatments the composition of the steel may be relatively uniform throughout.

As shown in the chart 300, the steel used to form the components, as discussed herein, may include Mn in the range of about 0.2% to about 1% by weight, Si in the range of about 0% to about 0.3% by weight, P in the range of about 0% to about 0.3% by weight, S in the range of about 0% to about 0.01% by weight, Ni in the range of about 0% to about 0.3% by weight, Cr in the range of about 1.5% to about 2% by weight, Mo in the range of about 1.7% to about 2.4% by weight, and V in the range of about 0.1% to about 1% by weight. As shown in chart 302, one particular composition of steel that may be used to rough form the component, such as the nozzle tip 120, may include C of about 0.3% by weight, Mn of about 0.5% by weight, Si of about 0.13% by weight, P of 0.013% by weight, S of about 0.001% by weight, Ni of about 0.2% by weight, Cr of about 1.7% by weight, Mo of about 2% by weight, and V of about 0.5% by weight.

The concentrations of additives and/or impurities in the steel, as depicted in charts 300, 302 may allow for the formation of the structures, as discussed in conjunction with FIG. 2. For example, the metallurgical concentrations discussed herein may be well suited to form the outer layer 206 and the core layer 204, as depicted for the nozzle tip 120 in FIG. 2. In other words, the relatively hard, compressively stressed outer layer 206 with the relatively softer core layer 204 that is under tensile stress may be formed using the chemical concentrations of the steel, as discussed herein. However, other metallurgical compositions other than the ones discussed in charts 300, 302, with individual elemental compositions greater or less than those listed or with additional or fewer elemental additives, may also provide structures similar to those discussed in conjunction with FIG. 2. As disclosed above, the configuration of the harder outer layer 206 encasing the softer core layer 204, as enabled by the chemical compositions disclosed herein, provides a relatively high level of durability, and therefore greater lifetime of components subject to harsh operating conditions. In some cases, the metallurgical compositions, as disclosed herein, may be relatively more cost effective (e.g., cheaper) than other alloy steel compositions that may be used to form components with desired hardness properties and/or hardness profiles.

Figure 4:
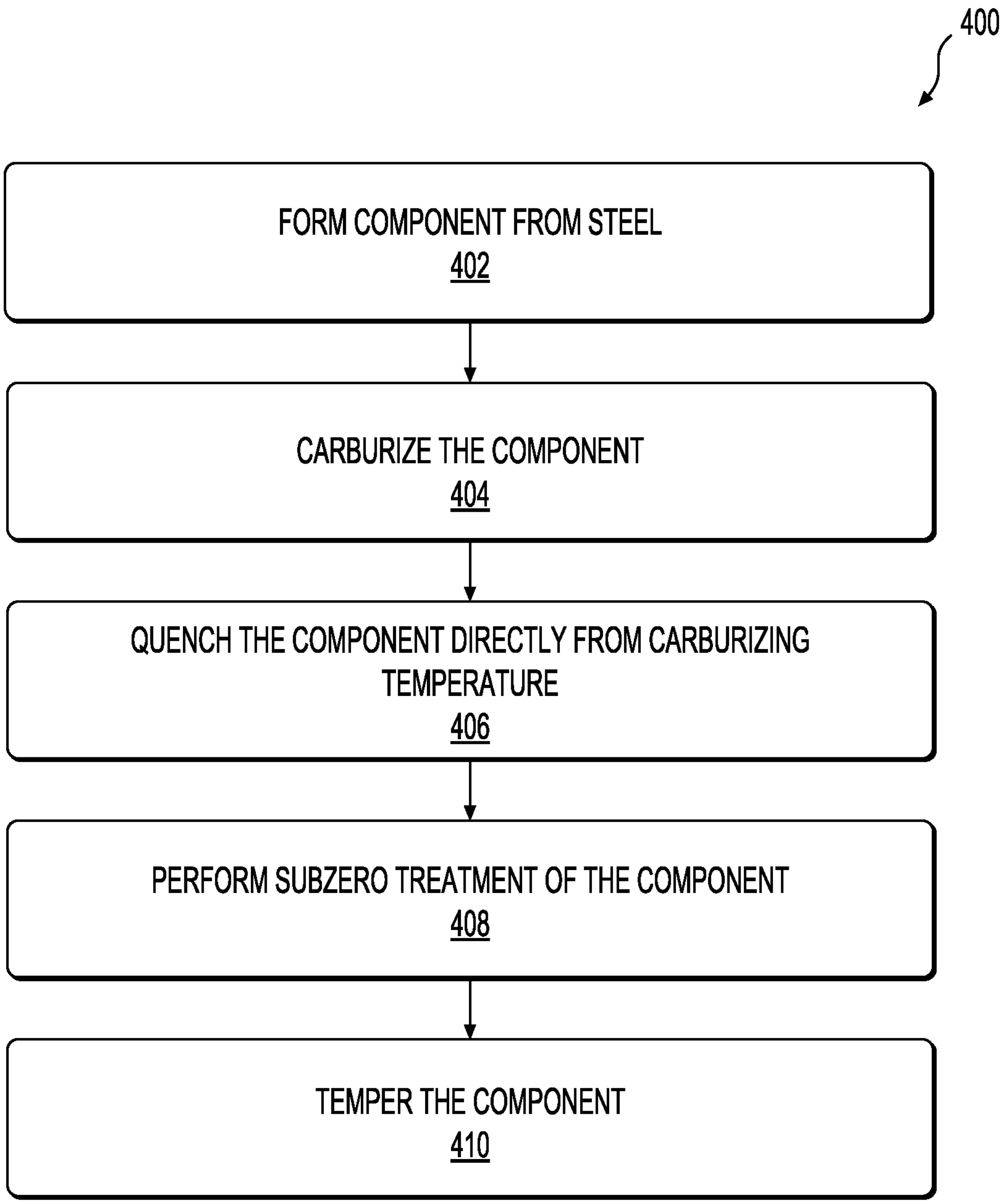
FIG. 4 is a flow diagram depicting an example method for hardening an example component of the machine as depicted in FIG. 1, according to examples of the disclosure.

FIG. 4 is a flow diagram depicting an example method 400 for hardening an example component of the machine 100 as depicted in FIG. 1, according to examples of the disclosure. The method 400 may be performed using low-carbon steel, medium-carbon steel, or the like, as discussed herein. In examples of the disclosure, the starting steel may have a composition as discussed in conjunction with FIG. 3. Alternatively, higher carbon steel may be used. In some cases, if the starting low or medium carbon steel is not in a ferritic structure, then optionally, a tempering process may be performed prior to commencing the method 400.

At block 402, the component is formed with steel. This is a rough formation of the component, such as the nozzle tip 120, the nozzle valve 122, the cylinder 130, etc., prior to subsequent processing. The component may be formed by any suitable mechanism such as any suitable hot formation mechanism and/or machining technique. For example, any type of casting, rolling, hot rolling, cold rolling, extrusion, combinations thereof, or the like may be used to form the rough component. Additionally or alternatively, the rough component may be formed by any variety of machining techniques suitable for forming the component, such as any type of shaping, turning, milling, drilling, grinding, chiseling, lathing, and/or other machining techniques.

The component, during rough formation, may be any suitable crystal structure, such as ferrite, pearlite, bainite, cementite, martensite, and/or austenite. In some cases, the starting steel may have a relatively high level of relatively softer ferrite and/or pearlite crystal structure. The initial low or medium carbon steel may be relatively soft and ductile, allowing for easier formation of the rough component, such as a rough nozzle tip. For example, the steel may have an initial hardness in the range of about 80 Rockwell Hardness Scale B (HRB) to about 100 HRB. In other cases, the steel may have an initial hardness in the range of about 30 HRC to about 40 HRC. The hardness ranges here, and throughout the disclosure, are examples, and hardness ranges shorter or longer may be used in accordance with examples of the disclosure.

At block 404, the component may be carburized. The carburizing process may involve a diffusion process and/or a cycle of diffusion processes, where the component is held at a carburizing temperature in a carbon rich environment. For example, the component may be held in a furnace at an elevated temperature while flowing carbon containing gases in the furnace. The carburizing process selectively introduces a relatively high concentration of C proximal to the surfaces 202, 208 of the component. These regions of relatively high carbon concentration form the outer layer 206, while the regions that are more distal from the surfaces 202, 208 do not have substantial C diffused therein from the carburizing process, and those regions away from the surfaces 202, 208 form the core layer 204 of the component. In some cases, the carburizing process may be a vacuum carburizing process, where the carburizing process may be performed in a partial vacuum ambient within the furnace. Alternatively, the carburizing process may be performed in an atmospheric pressure ambient, a nitrogen ambient, an argon ambient, combinations thereof, or the like. In some alternative examples, a nitro-carburizing process, or other similar variations from a carburizing process may be performed instead of the carburizing process.

It should be understood that the partial vacuum carburization process may provide an advantage in carburizing surfaces 202, 208 that are shielded from the carbon containing reactants in the carburizing ambient. For example, surfaces that are at the bottom of relatively high aspect ratio holes and/or trenches, as in the case of the nozzle tip 120, may be difficult to carburize using atmospheric carburization techniques. This difficulty may be due to relatively short path length of carbon containing reactants due to scattering in relatively high aspect ratio holes and/or trenches. However, in a partial vacuum ambient for carburization, relatively reduced gaseous scattering may result in relatively longer path lengths of the carbon containing reactants, thereby allowing the transport of the carbon containing reactants to the bottom of relatively deep holes and trenches. Therefore, the surface processes (e.g., diffusion, etc.) of carburization, at the bottom of relatively deep holes and/or trenches, may proceed due to the availability of carbon containing reactants at those surfaces.

The furnace process for carburizing the surface may be performed at any suitable temperature and time. For example, the furnace process may be performed at a temperature between about 850° C. and about 1200° C. for a time range of about 1 hour to about 24 hours. In some examples, the furnace process may be performed in a temperature range from about 900° C. to about 1100° C. for a time range of about 14 hours to about 18 hours. In other examples, the furnace process may be performed in a temperature range from about 950° C. to about 1000° C. The carburizing process may involve a pulse and pause style processing, where there are breaks between the c-containing gas flow. The total pulse time may be in the range of about 30 seconds to about 5 min in some examples. In other cases, the total pulse time may be in the range of about 1 min to about 2 min. In some cases, the carburizing process may be a batch process, where more than one component of the machine 100 may be carburized simultaneously.

During the furnace process, carbon containing gases may be flowed into the furnace to provide a carbon rich ambient, from which carbon diffuses into the surface regions of the rough component. For example, acetylene may be flowed into the furnace at a suitable flow rate to carburize the surface regions of the rough components. In other examples, liquified petroleum gas (LPG) may be flowed into the furnace at a suitable flow rate to carburize the surface regions of the rough components. Other carbon sources may include, but are not limited to carbon dioxide, carbon monoxide, methane, ethane, propane, butane, pentane, other carbon containing molecules, combinations thereof, or the like.

As discussed herein, the carburizing process may be a diffusion limited process. For example, the carburizing process may be a Fickian process (e.g., defined by Fick's second law) where the process is substantially self-limiting, rendering the process thermally and/or temporally inefficient beyond the formation of a carbon-rich layer of a certain thickness, such as about 3 mm to about 6 mm. As a result, the self-limiting nature of the carburization process, it may be difficult to form a relatively thick casing region on the component being carburized. Therefore, the carburizing process may be particularly useful in applications where a hard outer layer less than about 3 mm may be needed. Hardened martensitic carbon-rich steel casing, while providing high wear resistance and compressive stress, is generally brittle and lack ductility. Thus, limiting the hardened carbon-rich steel as a casing on the surface of the component provides benefits from a cracking standpoint, while softer inner portions the component allow for toughness and fatigue resistance of the component.

It should also be noted that since the carburizing process is a diffusion process (e.g., diffusion of carbon into low or medium carbon steel), the carbon content may diminish away from the surface of the carburized component. For example, carbon concentration may be greatest on the surface of the component and progressively lower farther away from the surface. The carbon concentration at the surface of the component may be in the range of about 0.7% to about 1.6% by weight and may decrease monotonically away from the surface of the component, until the carbon concentration is substantially similar to the bulk carbon concentration of the component. This bulk carbon concentration of the component may be substantially similar to the starting carbon concentration of the low or medium carbon steel.

After the carburizing process, a carbon-rich surface region may be formed on the rough component, such as outer layer 206, in the case of nozzle tip 120. The carbon-rich surface region, after the remainder of method 400, may have a hardened martensitic and/or austenitic crystal structure. In other words, the rough component may have a hardened casing on its surface regions, due to having a relatively higher carbon content near its surfaces due to the carburizing process. As a result of the carburizing process, the hardness of the surface regions, after the remaining processes of method 400, may be in the range of about 55 HRC to about 69 HRC.

At block 406, the component is quenched directly from the carburizing temperature. After performing the furnace process, the rough component, such as nozzle tip 120 or bushing 136, may be quenched, such as in a nitrogen ambient. Alternatively, the quenching process may be in any suitable medium, such as a salt bath, water, air, and/or oil. In some examples, the component may be cooled at a rate of approximately between about 1° C./second (° C./s) (or 60° C./minute (° C./min)) and about 10° C./s (or 600° C./min). In other examples, the component may be cooled at a rate of approximately between about 2° C./s (or 120° C./min) and about 6° C./s (or 360° C./min). During the quenching process, the component may be cooled from the carburizing temperature to near room temperature. The quenching process may result in a relatively high level of martensite crystal structure in the regions with relatively high carbon content due to the carburizing process of block 404. This martensitic texture results in a hardening of those relatively carbon-rich regions proximal to the outer surface of the component. The carbon incorporation into the relatively carbon-rich regions relative to the bulk of the component may result in compressive stress in the carbon-rich regions.

At block 408, the component is subject to a subzero process. This process may be performed using liquid nitrogen or other cryogenic fluids to cool the component to subzero temperatures. For example, the subzero process may cool the component to a range of about −100° C. to about −175° C. for a range of about 2 hours (hr) to about 4 hr. These temperatures and times are examples, and it should be understood that other temperatures and times greater than or less than those listed may be used in the subzero process. This subzero process may transform more of the carbon rich surface regions to martensitic crystal structure beyond the martensitic composition achieved after quenching, thereby hardening those regions further. This subzero process may also contribute to the outer layer 206 having a compressive stress.

At block 410, the component is tempered. The tempering process may be conducted a furnace with a non-oxidizing and/or reducing ambient (e.g., nitrogen ambient, argon ambient, etc.). In examples of the disclosure, the tempering process may be conducted at a particular temperature, such as about 350° C., for a multi-hour anneal. In some cases, the steel may be held at a temperature range between about 150°

C. and about 600° C. for about 1 to 10 hours to temper the steel component, such as the nozzle tip 120 or the cutting edge 114. In other cases, the steel may be held at a temperature range between about 250° C. and about 450° C. for about 1 to 10 hours to temper the steel component, such as the nozzle valve 122 or the piston 132. In still other cases, the steel may be held at a temperature range between about 300° C. and about 400° C. for about 1 to 10 hours to temper the steel component, such as the track shoe 134 or the cylinder 130. The tempering process may lead to both the core layer 204 and the outer layer having a martensitic crystal structure, with the outer layer 206 having a greater carbon content than the core layer 204 due to the carburizing process of block 404. Due to the greater carbon content of the outer layer 206 relative to the core layer 204, the outer layer 206 has a greater hardness than the core layer 204.

Although certain processes are discussed with respect to method 400, it should be understood that there may be other processes implemented in addition to the processes listed here. For example, if volumetric material swell is anticipated due to the carburizing process and the resulting incorporation of carbon into the surfaces of the component, then an undercut or other machining process may be implemented prior to or after the method 400 to compensate for any anticipated dimensional changes. Additionally, in some applications, it may be advantageous to have a thicker hard outer layer than that afforded by the carburizing process. In these cases, other processes, such as hard-facing, may be used to provide a thicker outer layer. Indeed, any suitable processes may be performed prior to or after the processes of method 400.

It should be appreciated that after performing method 400, the outer layer of the component (e.g., the outer layer 206 of nozzle tip 120) may be substantially martensitic and/or austenitic in crystal structure with a relatively high carbon content compared to the core layer. It should also be appreciated that the method 400 may result in a carbon profile that results in a relatively high level of carbon at the outer layer, such as outer layer 206, with a relatively sharp gradient or drop-off in the carbon content at the core layer 204. This relatively sharp drop-off of the carbon profile may allow for relatively thin components or portions of components, such as the injector tip 120, to have a hard outer layer 206 while still maintaining the relatively soft core layer 204. Thus, the outer layer, as disclosed herein, may be harder than the core layer of the component. It should also be understood that the advantageous hardness profile and/or carbon profile may be achieved without having to perform additional machining and/or removal processes after forming the component. Additionally, the outer layer of the component may be in compressive stress, while the core layer may be in tensile stress. Further still, the method 400 allows for components to be used at relatively high temperatures and substantially retain their hardness profiles. For example, an injector tip 120 that is exposed, such as during use, to a temperature of 300° C. or more may still have a hardness of about 59 HRC or greater at a depth of about 250 μm. Thus, method 400, individually or in combination with the metallurgical compositions described in conjunction with FIG. 3, allows for the formation of the advantageous structures, as described in conjunction with FIG. 2, thereby enhancing the durability and lifetime of the components.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
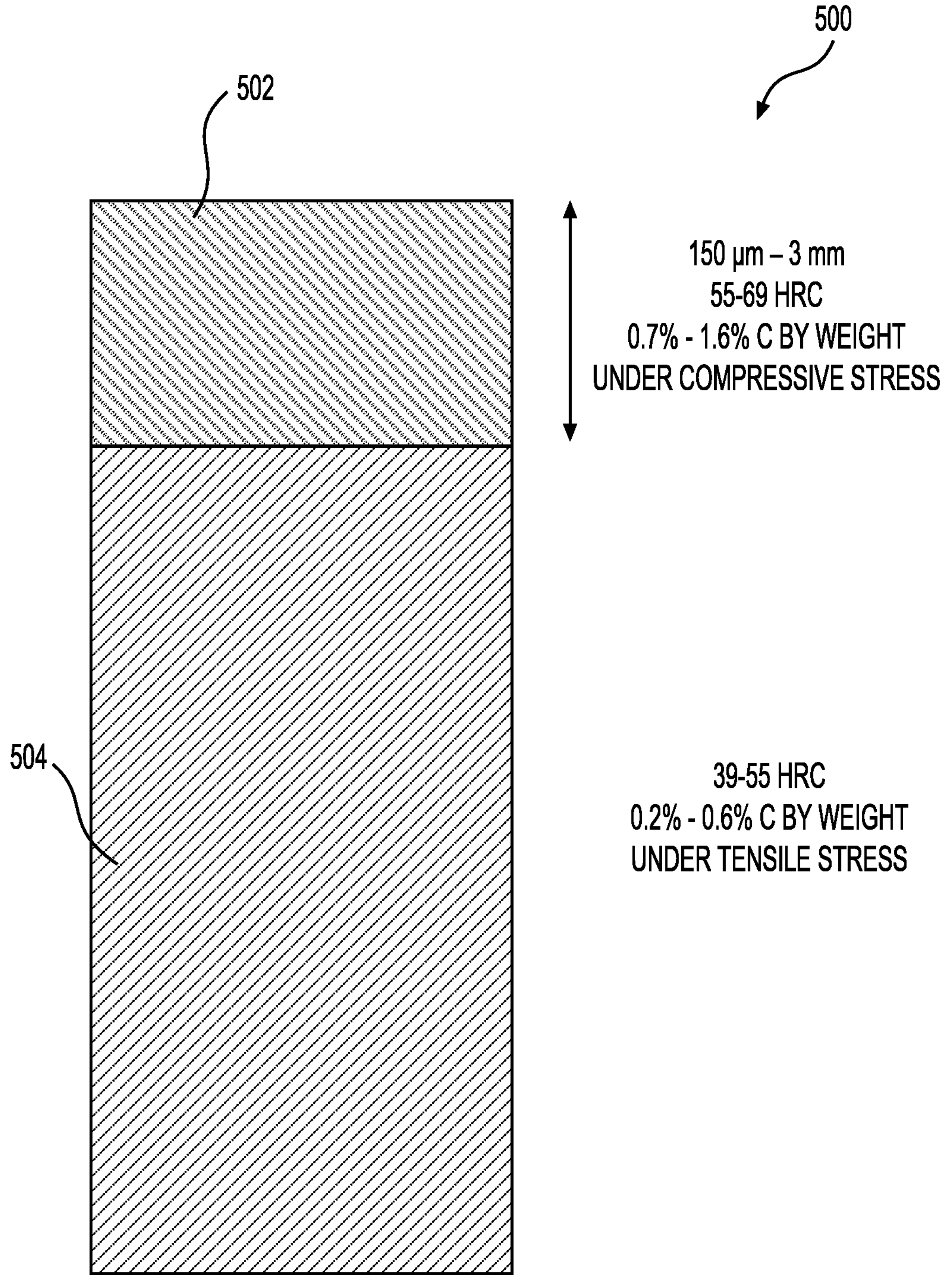
FIG. 5 is a sectional illustration of an example component surface, according to examples of the disclosure.

FIG. 5 is a sectional illustration of an example component surface 500, according to examples of the disclosure. The component may have an outer layer 502 and a core layer 504, as disclosed herein. The formation of the component with the example component surface 500 may be enabled by the steel composition, as described in conjunction with FIG. 3, and/or the material processing method 400, as described in conjunction with FIG. 4. The discussion herein may apply to any of the components of the machine 100, as described in conjunction with FIG. 1, as well as components manufactured for other applications and/or industries.

As discussed herein, the outer layer 502 may also be referred to as a hard layer, outer layer, or case layer. Similarly, the core layer 504 may also be referred to as a core region or bulk region. Although the outer layer 502 and the core layer 504 are depicted as having a sharp transition, it should be understood that in some cases the transition from the outer layer 502 to the core layer 504 may be graded and/or gradual. In other words, there may be a spatial transition region that embodies material properties intermediate between the core layer 504 and the outer layer 502.

According to examples of the disclosure, the outer layer 502 and the core layer 504 may be substantially martensitic and/or austenitic in crystal structure, with the outer layer 502 having relatively greater carbon content than the core layer 504. Thus, the outer layer 502 may be harder than the core layer 504 of the component. In some cases, the core layer 504 may have a hardness in the range of approximately 39 HRC to approximately 55 HRC. In other cases, the core layer 504 may have a hardness in the range of approximately 42 HRC to approximately 50 HRC. In yet other cases, the core layer 504 may have a hardness in the range of approximately 44 HRC to approximately 48 HRC. In some cases, the outer layer 502 may have a hardness in the range of approximately 55 HRC to approximately 69 HRC. In other cases, the outer layer 502 may have a hardness in the range of approximately 58 HRC to approximately 64 HRC. In yet other cases, the outer layer 502 may have a hardness in the range of approximately 60 HRC to approximately 62 HRC.

It should also be understood that the properties of the outer layer 502 may not be uniform throughout the thickness of the outer layer 502. In some cases, the presence of the outer layer 502 may be detected by measuring the hardness at a threshold depth into the outer layer 502. For example, the hardness at a depth of approximately 250 μm into the outer layer 502 may be in the range of approximately 56 HRC to about 67 HRC. In some cases, the hardness at a depth of approximately 250 μm into the outer layer 502 may be in the range of approximately 58 HRC to about 65 HRC. In yet some other cases, the hardness at a depth of approximately 250 μm into the outer layer 502 may be in the range of approximately 58 HRC to about 64 HRC. For example, in some cases, the hardness at a depth of 250 μm into the outer layer 502 may be approximately a minimum of 59 HRC.

The outer layer 502 may be of any suitable thickness. For example, the outer layer 502 may be a thickness in the range of about 150 μm to about 3 mm. In some other cases, the thickness of the outer layer 502 may be in the range of approximately 200 μm to about 1.7 mm. In yet other cases, the thickness of the outer layer 206 may be in the range of approximately 300 μm to about 1 mm. For example, the outer layer 206 may have a thickness of about 500 μm. Although the disclosure discusses certain thicknesses of the outer layer 502 herein, it should be understood that the disclosure contemplates thicknesses outside of the ranges discussed herein. It should also be understood that the thickness of the outer layer 502 may vary based at least in part on the component and/or the application of the component. For example, a thicker outer layer may be desired for a track shoe 134, compared to the nozzle valve 122.

The outer layer 502 may have a thickness, in some cases, such that the maximum Hertzian stress generated due to impact between the component and one or more other objects is within the outer layer 502. The outer layer 502 is not just harder, but in some cases, the outer layer 502 is also in compressive stress, while the core layer 504 is in tensile stress. Thus, by engineering this component such that the maximum Hertzian stress from impacts in a compressively stressed region, such as the outer layer 502, a lower possibility of cracking can be achieved, leading to greater durability of the component. In addition to the advantageous stress profile described herein, the enhanced hardness of the outer layer 502 improves its durability to impacts, such as impacts at elevated ambient temperatures. In some examples, the outer layer 502 of the component may be approximately 500 μm thick and the maximum Hertzian stress from impacts with the component may be at a surface depth of about 300 μm. Thus, in this example, the maximum Hertzian stress may occur in the relatively hard and compressively stressed outer layer 502.

It should be understood that the structure of the component surface 500, as depicted in FIG. 5, can be fabricated using the material compositions and/or the processes disclosed herein. The component surface 500, as fabricated may provide enhanced resistance to cracking and/or fracturing, particularly fracturing due to impacts with other objects in elevated ambient temperatures. Crack initiation and/or propagation may be inhibited, in some cases, due to the compressive stress in the outer layer 502. Thus, the hardness profile and/or the stress profile of the component surface 500 may provide overall improved durability and lifetime of the component.

INDUSTRIAL APPLICABILITY

The present disclosure describes systems, structures, and methods to reduce crack initiation and/or crack propagation, while increasing wear tolerance, fatigue resistance, and/or toughness of components, such as components for machines 100. These improved components may include fuel injector nozzle tips 120, fuel injector nozzle valves 122, track shoes 134, bushings 136, edges 114, hydraulic cylinders 130, hydraulic pistons 132, or any other structure or component including a hardened, crack resistant, and/or wear-resistant surface. The components, as disclosed herein, may have a hard, wear-resistant surface portions, as well as a soft core portion. The soft core portion provides for a high level of toughness of the components, while the hard surface portions provide for a high level of wear resistance during operation. Additionally, the surface portions may be under compressive stress, thereby inhibiting crack formation and/or crack propagation. Although the components, such as the nozzle tip 120, and the procedures to form the components are discussed in the context of machines 100, it should be appreciated that the mechanisms to form the same are applicable across a wide array of mechanical systems, such as any mechanical system that can benefit from improved fracture tolerance and/or wear resistance of various components.

As a result of the systems, apparatus, and methods described herein, parts of machines 100, such as fuel injectors 116, may have a greater lifetime. For example, the fuel injectors 116 described herein may have greater service lifetime than traditional fuel injectors that are not formed by the mechanisms described herein. In some cases, components, such as the bushings 136, may allow for a significant improvement in the wear lifetime of parts of the machines 100. This reduces field downtime, reduces the frequency of servicing and maintenance, and overall reduces the cost of heavy equipment, such as machines 100. The improved reliability and reduced field-level downtime also improves the user experience such that the machine 100 can be devoted to its intended purpose for longer times and for an overall greater percentage of its lifetime. Improved machine 100 uptime and reduced scheduled maintenance may allow for more efficient deployment of resources (e.g., fewer, but more reliable machines 100 at a construction site). Thus, the technologies disclosed herein improve the efficiency of project resources (e.g., construction resources, mining resources, etc.), provide greater uptime of project resources, and improves the financial performance of project resources.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A fuel injector, comprising:

a housing;

a nozzle tip seated within the housing, the nozzle tip comprising a body through which fuel is delivered, the body comprising:

a first outer layer, positioned on an external surface of the body, having a hardness of at least about 55 Rockwell Hardness Scale C (HRC) at or adjacent the external surface, the first outer layer also having a compressive stress, the first outer layer having a vanadium content of at least about 0.1% by weight, and a first carbon content in a first range of 0.7% by weight to 1.6% by weight;

a second outer layer having a hardness of at least about 55 Rockwell Hardness Scale C (HRC) and compressive stress, the second outer layer having a vanadium content of at least about 0.1% by weight, a second carbon content in a second range of 0.7% by weight to 1.6% by weight, and positioned on an internal surface of the body, a core layer encased by the first outer layer and the second outer layer, the core layer having a third carbon content in a third range of 0.17% by weight to 0.5% by weight, a hardness less than about 55 HRC, and tensile stress, wherein the third range does not overlap the first range or the second range to produce a drop-off in carbon content from the first outer layer to the core layer; and wherein the first outer layer is at least 250 micrometers (μm) in thickness, and wherein the first outer layer maintains a first hardness of at least 59 HRC at a depth of at least 250 μm from the external surface after the fuel injector is exposed to a temperature of at least about 300° C. in an operating environment for at least about 3 hours.

2. The fuel injector of claim 1, wherein the core layer comprises manganese (Mn) in a range of about 0.2% to about 1% by weight, silicon (Si) in a range of about 0% to about 0.3% by weight, phosphorous (P) in a range of about 0% to about 0.3% by weight, sulfur (S) in a range of about 0% to about 0.01% by weight, nickel (Ni) in a range of about 0% to about 0.3% by weight, Chromium (Cr) in a range of about 1.5% to about 2% by weight, molybdenum (Mo) in a range of about 1.7% to about 2.4% by weight, and vanadium (V) in a range of about 0.1% to about 1% by weight.

3. The fuel injector of claim 1, wherein the first outer layer has a second hardness of at least 60 HRC at a depth of at least 200 μm after the fuel injector is exposed to a temperature of at least about 300° C. for at least about 3 hours.

4. The fuel injector of claim 1, wherein the first outer layer has a first hardness of at least 59 HRC at a depth of 250 μm from the external surface and a second hardness of less than 53 HRC at a depth from the external surface of about 600 μm from the external surface after the fuel injector is exposed, in the operating environment, to a temperature of at least about 300° C. for at least about 3 hours.

5. The fuel injector of claim 1, wherein the fuel injector further comprises a fuel injector nozzle valve that contacts the internal surface to control delivery of fuel through the fuel injector, the fuel injector nozzle valve comprising:

an outer layer having a hardness of at least about 55 Rockwell Hardness Scale C (HRC) and compressive stress, the outer layer having a vanadium content of at least about 0.1% by weight and positioned on an external surface of the fuel injector nozzle valve; and a core layer encased by the outer layer, the core layer having a hardness less than about 55 HRC and tensile stress; and wherein the outer layer is at least 250 micrometers (μm) in thickness, and wherein the outer layer maintains a first hardness of at least 59 HRC at a depth of at least 250 μm after the fuel injector nozzle valve is exposed to a temperature of at least about 300° C. in an operating environment for at least about 3 hours.

6. A fuel system for a machine comprising one or more fuel injection components, wherein at least one of the fuel injection components comprises a body having:

an outer layer including an outer surface having a first hardness of at least about 55 Rockwell Hardness Scale C (HRC) and compressive stress and positioned on an external surface of the body, wherein the outer layer has a first carbon content in a first range of about 0.7% by weight to about 1.6% by weight and has a thickness of at least 300 microns (μm); and a core layer encased by the outer layer, the core layer having a second hardness less than about 55 HRC, a second carbon content in a second range of 0.17% by weight to about 0.5% by weight, and tensile stress, wherein the second range and the first range are non-overlapping, wherein, a third hardness at a first depth of about 250 microns (μm) from the external surface is at least about 59 HRC and a fourth hardness at a second depth of about 600 μm from the external surface is less than about 53 HRC after the one or more fuel injection components is exposed to a temperature of at least about 300° C. in an operating environment for at least about 3 hours.

7. The fuel system of claim 6, wherein the core layer comprises manganese (Mn) in a range of about 0.2% to about 1% by weight, silicon (Si) in a range of about 0% to about 0.3% by weight, phosphorous (P) in a range of about 0% to about 0.3% by weight, sulfur (S) in a range of about 0% to about 0.01% by weight, nickel (Ni) in a range of about 0% to about 0.3% by weight, chromium (Cr) in a range of about 1.5% to about 2% by weight, molybdenum (Mo) in a range of about 1.7% to about 2.4% by weight, and vanadium (V) in a range of about 0.1% to about 1% by weight.

8. The fuel system of claim 6, wherein the outer layer has a hardness of at least 60 HRC at a depth of about 200 μm from the external surface after the at least one of the one or more fuel injection components are exposed to a temperature of at least about 300° C. in the operating environment for at least about 3 hours.

9. The fuel injector of claim 1, further comprising a nozzle valve movably positioned within the nozzle tip, wherein, during operation, a maximum hertzian stress is formed within the second outer layer during a collision between the nozzle valve and the nozzle tip.

10. The fuel system of claim 6, further comprising:

a second outer layer having a first hardness of at least about 55 Rockwell Hardness Scale C (HRC) and compressive stress and positioned on an internal surface of the body, wherein the second outer layer has a first carbon content in a range of about 0.7% by weight to about 1.6% by weight and has a thickness of at least 300 microns (μm); and a nozzle valve movably positioned within the nozzle tip, wherein, during operation, a maximum hertzian stress is formed within the second outer layer during a collision between the nozzle valve and the nozzle tip.

* * * * *